United States Patent [19]

Schrempp et al.

[11] 3,849,150

[45] Nov. 19, 1974

[54] PRODUCTION OF PIGMENT PASTES FOR PRINTING INK AND VARNISH PAINT

[75] Inventors: Klaus Schrempp, Ludwigshafen; Werner Jettmar, Mannheim; Rudolf Polster, Frankenthal; Eduard Hartmann, Limbuergerhof, all of Germany

[73] Assignee: Badische Anilin & Soda Fabrik Aktiengesellschaft, Rheinland-Pfalz, Germany

[22] Filed: June 13, 1972

[21] Appl. No.: 262,352

[52] U.S. Cl. ............................ 106/288 Q, 106/309
[51] Int. Cl. .............................................. C08h 17/14
[58] Field of Search ...... 106/288 Q, 309; 260/314.5

[56] References Cited
UNITED STATES PATENTS 3,252,991  5/1966  Schmidt ........................ 260/314.5
3,351,481  11/1967  Hopmeier ........................ 106/288
3,598,625  8/1971  Buckwalter ........................ 106/309

Primary Examiner—Delbert E. Gantz
Assistant Examiner—J. V. Howard
Attorney, Agent, or Firm—Johnston, Keil, Thompson & Shurtleff

[57] ABSTRACT

A method for the production of high tinctorial strength pigment pastes for printing inks or paints from finely ground crude pigments. Printing inks and varnish paints prepared from the pigment paste exhibit not only high tinting strength but also a particularly high brilliance.

7 Claims, No Drawings

PRODUCTION OF PIGMENT PASTES FOR PRINTING INK AND VARNISH PAINT

The invention relates to a process for the production of high tinctorial strength pigment pastes for printing inks and paints without previous conditioning of the pigments used.

For the production of printing inks and varnish paints, pigments are dispersed in mixtures of solvents and film forming agents. In order to achieve optimum coloring of prints or coatings prepared therefrom, considerable importance is attached to the shape and the surface of the coloring pigment particles. For example phthalocyanine pigments should have a particle size of from 0.01 to 1 micron, preferably from 0.05 to 0.3 micron, and should have a surface area, measured by the BET method, of from 30 to 100 $m^2/g$. It is necessary in order to achieve a brilliant shade that the said particles should be distributed as completely and as uniformly as possible in the substrate. Well crystallized isometric particles having a smooth surface are necessary for this purpose. These particles are obtained in conditioning operations which consist of one or more treatments. For this purpose the crude pigment may for example be comminuted in ball mills or kneaders in the presence of a water-soluble grinding aid in the presence or absence of organic solvents or auxiliaries. Another possible method of conditioning is by dissolving or suspending the crude pigment in a concentrated acid followed by dilution with water.

Both methods are very expensive and moreover give dilute salt or acid solutions which are a nuisance in the aqueous effluent.

A method also has been described in which conditioning is carried out by stirring or grinding with sand, glass or other grinding elements in the presence of an organic solvent. After the grinding elements have been removed, the solvent has to be separated from the pigment by evaporation or by steam distillation. This method is also expensive. Not only is the method troublesome but it also has a more serious disadvantage. When the particles of pigment isolated from the aqueous or organic phase are dried they are reagglomerated so that in the production of printing ink or paint the particles have to be divided and wetted again by expenditure of energy in expensive machines. Attempts may be made to obviate these difficulties for example by kneading aqueous presscakes in dispersion apparatus with solutions of organic binders so that the pigment reverses phase and the water is for the most part separated mechanically and the remainder can be evaporated in vacuo. Although reagglomeration is thus avoided, this method, known as the flushing method, is an additional and very expensive step which has to be appended to the actual conditioning operation and only avoids the drying of the finished pigment.

We have now found that contrary to previous experience and statements in the literature high tinctorial strength pigment pastes for printing inks and paints are obtained direct without previous conditioning of the pigments by treating a finely divided crude pigment which has been distorted in crystallization, which has markedly agglomerated and whose primary particle size is less than 1 micron and whose BET surface area is within the range from 0.5 to 15 $m^2/g$ in a solvent or solvent mixture suitable for printing ink and varnish paint or a resin solution suitable for printing ink and varnish paint at from room temperature to 200°C until the pigment exhibits optimum tinctorial properties. The crude pigment is thus suspended well wetted in the solvent or resin solution. Then this suspension is exposed to a temperature treatment, the suspension advantageously being mixed or kneaded.

Crude pigments in the context of the present application are those which are in the form of fine, markedly agglomerated particles strongly distorted in crystal structure whose primary particle size is not more than 1 micron, the particles having a surface area, measured by the BET method, of from 0.5 to 15 $m^2/g$. Pigments having the said properties, in spite of their fine division, do not satisfy coloristic requirements.

The crude pigment may have been obtained for example direct in a synthesis or by subsequent comminution with or without grinding aids, for example in ball mills, vibrating mills or other comminution equipment, by a chemical treatment or by dissolving it in concentrated acid and reprecipitating it.

Examples of suitable crude pigments include polychloro, polychlorobromo and polybromo copper phthalocyanines and crude copper phthalocyanines having a chlorine content of from 0 to 10% by weight obtained from melts of aluminum chloride and sodium chloride by decomposition with water and which have been subjected to a dry grinding in a ball mill or other comminution machine; moreover peracids and their derivatives such as the diimides, N,N'-dialkylimides or N,N'-diarylimides, quinacridone and its derivatives or anthraquinonoid pigments after having been dissolved in sulfuric acid of various concentrations and reprecipitated therefrom or anthraquinoid pigments or peracid derivatives after oxidation of the reduced compounds. These compounds may also have been prepared direct in aqueous medium by condensation.

Pigments whose particle size is more than 1 micron cannot be processed directly by the process of the invention. They may however be brought into a suitable form by grinding without additives in ball mills or ball mills having stirring means (attritors).

Examples of solvents which are suitable for the production of pigment pastes for printing inks and paints include aromatic and aliphatic hydrocarbons such as benzene, toluene, ethylbenzene, the xylenes, chlorobenzene, gasoline fractions, mineral oil fractions, chlorinated aliphatic hydrocarbons such as ethylene chloride and tetrachloroethylene, aliphatic or araliphatic alcohols and phenols such as methanol, ethanol, propanol, isopropanol, the butanols, glycols, diacetone alcohol, benzyl alcohol, polyglycols, phenol, alkyl-substituted phenols and naphthols, ketones such as acetone, methyl ethyl ketone, methyl isobutyl ketone, acetophenone, cyclohexanone, or esters of organic acids such as acetic acid, propionic acid, glycolic acid, lactic acid esterified with aliphatic alcohols and glycols, carboxamides such as dimethylformamide, ethers such as glycol ethyl ether and diglycolalkyl ethers or mixtures of the said solvents.

The solvent may already contain a natural and/or synthetic organic resin as a binder. Examples of such binders are natural resins such as rosin, copal, dammar and shellac, processed natural resins such as polymerized rosin, rosin esterified with aliphatic monohydric or polyhydric alcohols and/or monohydric or polyhydric phenols, calcium, zinc or magnesium salts of rosin or synthetic resins such as maleic acid resins, phenol resins, urea resins, melamine resins, aldehyde resins, ketone resins, polyester resins, acrylate resins, polyvinyl acetate resins, polystyrene resins, polyisobutylene, cellulose esters, cellulose ethers, rubber derivatives, polyamides, epoxide resins and silicone resins.

In order to prepare the pigment paste, the finely divided crude pigment may for example be scattered or stirred into the solvent, the solvent mixture or the resin solution and the mixture then treated at a temperature of from room temperature to 200°C, preferably at from 20° to 160°C. A simple stirrer such as a dissolver, an attritor, a kneader, rollers or a mixer may be necessary for the treatment depending on the flow characteristics of the mixture. The ratio of pigment to liquid should be 1:100 to 1:0.5, preferably 1:20 to 1:1. The duration of the treatment, i.e. the period within which the pigment develops the optimum tinctorial properties, depends on the pigment, on the solvent used, on any binder used and on the temperature of the treatment. The duration of the treatment may be from a few minutes to several days; the said period may be shortened by raising the temperature or by measures which promote wetting such as additives or energy. Thus for example copper phthalocyanine in toluene or a toluene solution of a resin develop their optimum tinctorial properties within a few minutes at room temperature; in contrast resin solutions containing mineral oil have to be treated advantageously for some hours at 60° to 80°C with the same crude pigment. After the treatment, the desired pigment level or the desired viscosity and shade of the color may be set up by adding further solvent, resin or a mixture of both.

The process of the invention greatly simplifies the production of printing inks and paints and yields no waste products whatever which pollute the air or aqueous effluent. The pigments contained in the mixture exhibit a very uniform particle size and are distributed particularly well. Therefore prints or coatings prepared with these mixtures have particularly good depth of color and are brilliant.

The following examples illustrate the invention.

The parts and percentages specified are by weight.

EXAMPLE 1

23 parts of a ground crude pigment of copper phthalocyanine having a BET surface area of 8 m$^2$/g and a content of α-modification of 38 percent is ground in a ball mill having stirring means with 31 parts of a modified rosin, 10 parts of nonylphenol and 36 parts of mineral oil (boiling range 150° to 300°C) for 30 minutes at 70°C. A print paste which is of grindometer fineness is obtained which can be processed into particularly transparent and glossy prints in the offset method.

EXAMPLE 2

50 parts of the crude pigment described in Example 1, 10 parts of nonyl phenol and 40 parts of mineral oil (boiling point 150° to 300°C) are heated for 40 hours in a stirred vessel at 70°C. An outstandingly dispersed pigment paste of grindometer fineness is obtained.

30 parts of this paste is stirred for 30 minutes in a dissolver with 32 parts of a modified rosin, 33 parts of mineral oil (boiling range 150° to 300°C) and 5 parts of an oil-modified alkyd resin. After passage through a three-roll mill (applied pressure 10 atmospheres gauge) a completely homogeneous print paste is obtained.

EXAMPLE 3

50 parts of the crude pigment described in Example 1 and 50 parts of toluene are stirred for 6 hours at 70°C. 16 parts of this paste is stirred for 20 minutes with 84 parts of 35% phenol-modified rosin solution in toluene in a dissolver.

A toluene intaglio printing ink is obtained which has outstanding applicational performance and gives very brilliant prints.

EXAMPLE 4

33.3 parts of the crude pigment described in Example 1, 33.3 parts of toluene and 33.3 parts of ethanol are heated for three days at 70°C. A paste is obtained which may readily be dispersed in 600 parts of a solution of nitrocellulose. Prints having optimum properties as regards color strength, purity and gloss may be prepared therewith.

EXAMPLE 5

100 parts of the paste obtained according to Example 4 may be dispersed outstandingly by stirring in 600 parts of a solution of a copolymer of vinyl chloride and vinyl acetate which contains carboxylic groups. Prints prepared therewith have excellent tinctorial properties.

EXAMPLE 6

100 parts of the paste obtained according to Example 4 is stirred into 300 parts of a 35 percent solution of polyamide resin in a dissolver. A flexographic ink is obtained which gives prints having excellent tinctorial properties.

EXAMPLE 7

400 parts of crude polychloro copper phthalocyanine having a chlorine content of 49.5 percent (prepared by chlorination of copper phthalocyanine in aluminum chloride/sodium chloride melt) is flushed as a presscake in a kneader with 400 parts of mineral oil having a boiling range of 150° to 300°C. The water which separates is poured away and the mixture is heated for four hours at 100° to 110°C. 72 parts of the paste thus obtained is stirred with 48 parts of mineral oil and 80 parts of a modified rosin. The pigment is outstandingly dispersed in the print paste thus obtained. Deeply colored and brilliant prints can be obtained therefrom.

EXAMPLE 8

10 parts of a ground crude pigment from flavanthrone (prepared according to Example 5 of German Patent Application No. P 20 00 510.1) is introduced into 90 parts of a varnish of 67 parts of alkyd resin (30 percent in xylene), 17 parts of urea-formaldehyde resin (30 percent in butanol) and 16 parts of ethylene glycol and stirred for 1 hour to 2 hours at 40°C. The mixture is then dispersed for 20 minutes to one hour in a ball mill with stirring means, until the desired fine dispersion or viscosity has been achieved. Four parts of the colored varnish thus obtained is mixed with 30 parts of a white varnish containing 50 percent of titanium dioxide, exposed to the air, applied by spraying or dipping and baked for 20 minutes at 120°C. The coating obtained is superior in depth of color and purity of shade to a coating with a varnish which contains the same pigment but which has been prepared and conditioned conventionally (grinding for 40 hours with salt, removal of the salt by treatment with water, filtration, washing until the pigment is devoid of salt, drying and grinding).

EXAMPLE 9

100 parts of a dry condensation product of perylene-3,4,9,10-tetracarboxylic acid with p-aminoazobenzene which has been fractionated from sulfuric acid is stirred in 300 parts of ethylene glycol monoethyl ether at 130° to 135°C for five hours under reflux. Then 20 parts of this pigment dispersion is mixed with 15 parts of an alkyd resin solution (60 percent in xylene), 3.8 parts of a urea-formaldehyde resin solution (60 percent in butanol) and 11 parts of a mixture (1:1) of xylene and butanol, dispersed in a ball mill having stirring means and adjusted to the desired concentration. The coatings obtained with this varnish are superior in shade, hiding power and purity of shade to coatings which contain the same pigment which has however been conditioned by a conventional method, for example by pressure treatment.

EXAMPLE 10

10 parts of a ground copper phthalocyanine crude pigment having a chlorine content of 2.3 percent is introduced into 90 parts of a varnish from 67 parts of alkyd resin (30 percent in xylene), 17 parts of a urea-formaldehyde resin (30 percent in butanol) and 16 parts of ethylene glycol and stirred for six hours at 50°C. Then the mixture is dispersed in a ball mill having stirring means for 30 minutes. A varnish paste having excellent pigment dispersion is obtained, which gives coatings having particular brilliance after having been incorporated into an alkyd resin varnish.

EXAMPLE 11

15 parts of a ground crude pigment from copper phthalocyanine having a BET surface area of 5.5 m$^2$/g and a content of $\alpha$-modification of 58 percent is introduced into a solution of 25 parts of a ketone resin in 60 parts of a solvent mixture of equal parts of xylene, butanol and ethyl glycol and the mixture is slowly stirred for 3 hours at 90°C. Without the use of grinding energy a stock paste is obtained which contains the pigment in outstanding dispersion.

To prepare an acrylate-melamine resin 35 parts of the stock paste is introduced into a mixture of 42.5 parts of an acrylate varnish (acrylate resin 50 percent in butanol/xylene 1:1) and 22.5 parts of a melamine varnish (melamine resin 55 percent in butanol/xylene 1:1) and stirred for 10 minutes in a dissolver. Deeply colored coatings having excellent brilliance are obtained.

If a commercial copper phthalocyanine pigment is processed in the same way, only weakly colored, dull and spotted coatings are obtained.

The said stock paste may be incorporated in the same way into other varnish systems, for example alkydal-melamine varnish or air-drying varnish systems.

EXAMPLE 12

5 parts of a condensation product of p-chloroaniline and perylene-3,4,9,10-tetracarboxylic acid (BET surface area: 7.4 m$^2$/g) is stirred for 30 minutes in a ball mill fitted with stirring means with 45 parts of a varnish consisting of 22 parts of alkyd resin, 10 parts of melamine resin and 68 parts of a mixture of xylene, butanol and glycol monoethyl ether in equal proportions. A varnish is obtained having excellent pigment distribution which gives coatings having special brilliance.

We claim:

1. A process for the production of high tinctorial strength pigment pastes for printing inks and varnish paints without a previous conditioning of an initial agglomerate-forming finely particled crude pigment, which process comprises admixing said crude pigment, which has been distorted in crystallization and which is strongly agglomerated and whose primary particle size is less than 1 micron and whose BET surface area is within the range from 0.5 to 15 m$^2$/g, at room temperature to 200°C. in a liquid medium consisting essentially of an organic solvent suitable for said printing inks and varnish paints or a mixture of such solvents or a resin solution in such solvents, the ratio of crude pigment to liquid medium being from 1:100 to 1:0.5, and further mixing the resulting suspension consisting essentially of said pigment and said solvent at said temperature until the pigment exhibits optimum tinctorial properties as evidenced by a very uniform particle size and uniform distribution in said solvent.

2. A process as claimed in claim 1 wherein the crude pigment used is a copper phthalocyanine, a polychloro copper phthalocyanine, a polychlorobromo copper phthalocyanine, a polybromo copper phthalocyanine, a peracid, a peracid derivative, quinacridone or derivative thereof or an anthraquinoid pigment.

3. A process as claimed in claim 1 wherein the ratio of crude pigment to solvent, solvent mixture or resin solution is from 1:20 to 1:1.

4. A process as claimed in claim 1 wherein the treatment is carried out at a temperature within the range from 20° to 160°C.

5. A process as claimed in claim 1 wherein the solvent used is an aromatic or aliphatic hydrocarbon, a chlorinated aliphatic hydrocarbon, an aliphatic or araliphatic alcohol, a phenol, an alkylsubstituted phenol or naphthol, an aliphatic, cycloaliphatic or aliphatic-aromatic ketone, carboxylic ester, carboxamide, ether, ether alcohol or mixture of two or more of the same.

6. A process as claimed in claim 1 wherein the resin in the resin solution is a natural or synthetic resin or a mixture thereof.

7. A process as claimed in claim 3 wherein the resin in the resin solution is a natural or synthetic resin or a mixture thereof.

* * * * *

UNITED STATES PATENT OFFICE
CERTIFICATE OF CORRECTION

PATENT NO. : 3,849,150
DATED : November 19, 1974
INVENTOR(S) : Klaus Schrempp et al It is certified that error appears in the above-identified patent and that said Letters Patent are hereby corrected as shown below:

In the HEADING:

insert

-- Claims priority: Germany, June 30, 1971, P 21 32 546.2 --

Signed and Sealed this twenty-seventh Day of April 1976

[SEAL]

Attest:

RUTH C. MASON
Attesting Officer

C. MARSHALL DANN
Commissioner of Patents and Trademarks